United States Patent [19]
Rahman et al.

[11] Patent Number: 6,028,120
[45] Date of Patent: Feb. 22, 2000

[54] CHELATED POLYHYDROXSTYRENE FOR REMOVING METAL IONS FROM AQUEOUS AND NONAQUEOUS SYSTEMS

[75] Inventors: M. Dalil Rahman, Flemington, N.J.; John Saukaitis, Corpus Christi, Tex.; Robert E. Potvin, Providence, R.I.; Mohammad Khadim, Dhahran, Saudi Arabia

[73] Assignee: Clariant Finance (BVI) Limited, Switzerland

[21] Appl. No.: 08/991,033

[22] Filed: Dec. 15, 1997

[51] Int. Cl.$^7$ ............................ C08F 8/30; C08F 116/02
[52] U.S. Cl. .................... 521/32; 525/154; 525/328.8; 525/376; 430/175
[58] Field of Search ........................... 430/175; 525/154, 525/328.8, 376; 521/32

[56] References Cited

U.S. PATENT DOCUMENTS 5,705,322  1/1998  West .

FOREIGN PATENT DOCUMENTS 020559  1/1989  Japan .

*Primary Examiner*—David Buttner
*Attorney, Agent, or Firm*—Andrew F. Sayko, Jr.

[57] ABSTRACT

A process for producing a deionizing resin, which comprises reacting an organic compound having at least one reactive hydroxy group and at least one active chelating site with an organic polymer matrix having at least one reactive —OH or —NH$_2$ group, and thereby producing a chelated polymer complex, as shown in FIG. II or FIG. IV:

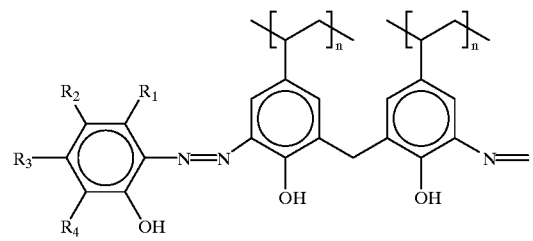

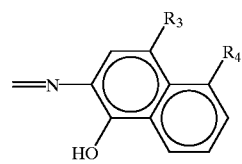

Washing the polymer complex with water, followed by washing with a mineral acid solution and then again washing with water and thereby reducing the level of sodium, iron and chromium ions in the polymer complex to less than 100 ppb each.

6 Claims, No Drawings

CHELATED POLYHYDROXSTYRENE FOR REMOVING METAL IONS FROM AQUEOUS AND NONAQUEOUS SYSTEMS

BACKGROUND OF THE INVENTION

The present invention relates to a process which comprises introducing a chelating group into a vinyl phenol polymer, such as a polyhydroxystyrene, (the reaction product hereinafter referred to as a Chelated Poly Vinyl Phenol—CPVP), by reacting a vinyl phenol polymer with a suitable diazonium salt of an aromatic amine, or substituted aromatic amine. Further, the present invention also relates to a process for producing a polymer which is insoluble in organic solvent systems (Condensed Substituted Poly Vinyl Phenol—CSPVP) by condensing a CPVP and formaldehyde to provide an organic solvent rigid CSPVP polymer. This polymer can then be ground to provide a particle size of, e.g. from about 200–400 mesh. The present invention also relates to a process for removing metal ions from such a CPVP or CSPVP to provide an ion exchange resin to remove metal ions from aqueous and non-aqueous systems, such as photoresist solutions or solutions of components for photoresist compositions.

Photoresist compositions are used in microlithorgraphy processes for making miniaturized electronic components such as in the fabrication of computer chips and integrated circuits. Generally, in these processes, a thin coating of a film of a photoresist composition is first applied to a substrate material, such as silicon wafers used for making integrated circuits. The coated substrate is then baked to evaporate substantially all of the solvent in the photoresist composition, and to fix the coating onto the substrate. The baked coated surface of the substrate is next subjected to an image-wise exposure to radiation.

This radiation exposure causes a chemical transformation in the exposed areas of the coated surface. Visible light, ultraviolet (UV) light, electron beam and X-ray radiant energy are radiation types commonly used today in microlithographic processes. After this image-wise exposure, the coated substrate is treated with a developer solution to dissolve and remove either the radiation-exposed or the unexposed areas of the coated surface of the substrate.

Metal ion contamination has been a problem for a long time in the fabrication of high density integrated circuits and computer chips, often leading to increased defects, yield losses, degradation and decreased performance. In plasma processes, metal ions such as sodium and iron, when they are present in photoresists, can cause contamination especially during plasma stripping. However, these problems may be overcome to a substantial extent during the fabrication process. For example, by utilizing HCl gettering of the contaminants during a high temperature anneal cycle.

As semiconductor devices have become more sophisticated, these problems have become much more difficult to overcome. When silicon wafers are coated with a liquid positive photoresist and subsequently stripped off, such as with oxygen microwave plasma, the performance and stability of the semiconductor device is often seen to decrease. As the plasma stripping process is repeated, more degradation of the device frequently occurs. A primary cause of such problems has been found to be the metal contamination in the photoresist, particularly sodium and iron ions. Metal levels of less than 1.0 ppm in the photoresist have been found to adversely affect the properties of such semiconductor devices.

SUMMARY OF THE INVENTION

The present invention relates to a process for producing a chelated poly vinyl phenol (CPVP), such as a chelated polyhydroxystyrene, by reacting a vinyl phenol polymer with a suitable diazonium salt of a aromatic amine or substituted aromatic amine, as shown in FIGS. I and III, below. The present invention further relates to a process for condensing the chelated vinyl phenol polymer from FIG. I with formaldehyde, as shown in FIG. II below. The invention further relates to a process for condensing the chelated vinyl phenol polymer from FIG. III with formaldehyde, as shown in FIG. IV, below. In FIGS. I, II, III and IV n preferably is 50–300.

FIG. I - Water Insoluble/Organic Soluble (CPVP)

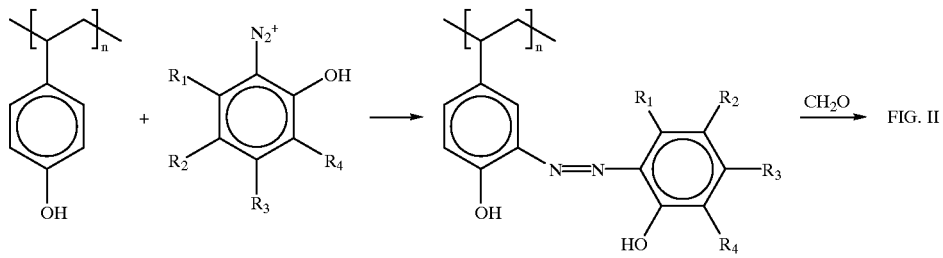

$R_1 = R_2 = R_3\text{-}R_4 = H$, or
$R_1 = OH, R_2 = R_3\text{-}R_4 = H$, or
$R_1 = R_2 = R_3 = R_4\text{-}OH$, or
$R_1 = R_2 = R_3 = R_4 = C_1\text{-}C_3$ alkyl.

-continued
FIG. II - Organic Insoluble (CSPVP)

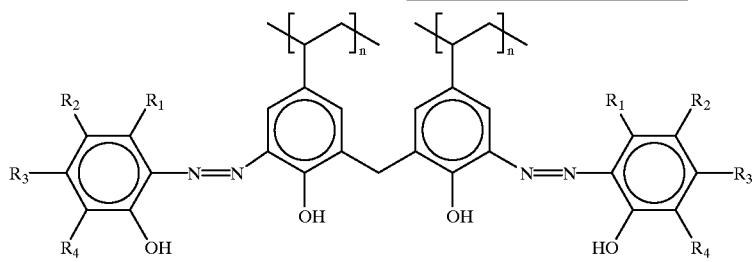

$R_1 = R_2 = R_3\text{-}R_4 = H$, or
$R_1 = OH$, $R_2 = R_3\text{-}R_4 = H$, or
$R_1 = R_2 = R_3 = R_4\text{-}OH$, or
$R_1 = R_2 = R_3 = R_4 = C_1\text{-}C_3$ alkyl.

FIG. III (CPVP)

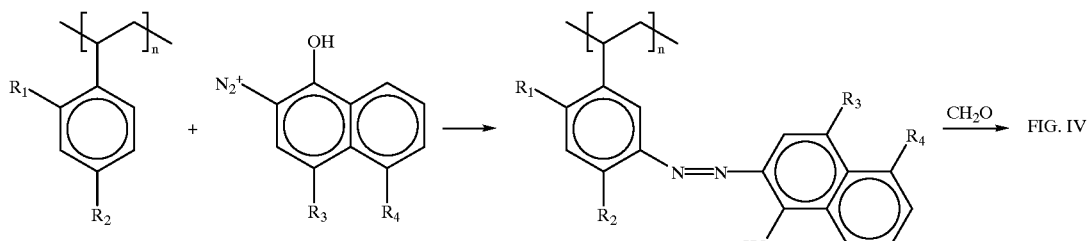

$R_1 = H$, $R_2 = OH$, $R_3 = H$, $R_4 = SO_3H$, or
$R_1 = OH$, $R_2 = H$, $R_3 = SO_3H$, $R_4 = H$, or
$R_1 = H$, $R_2 = NH_2$, $R_3 = H$, $R_4 = SO_3H$, or
$R_1 = NH_2$, $R_2 = H$, $R_3 = SO_3H$, $R_4 = H$.

FIG. IV (CSPVP)

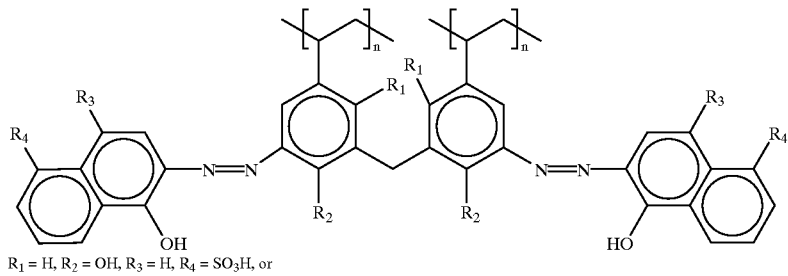

$R_1 = H$, $R_2 = OH$, $R_3 = H$, $R_4 = SO_3H$, or
$R_1 = OH$, $R_2 = H$, $R_3 = SO_3H$, $R_4 = H$, or
$R_1 = H$, $R_2 = NH_2$, $R_3 = H$, $R_4 = SO_3H$, or
$R_1 = NH_2$, $R_2 = H$, $R_3 = SO_3H$, $R_4 = H$.

The present invention further relates to a process for removing metal ions from such a chelated vinyl phenol polymer by washing it with an acid, such as a 5–60 weight percent mineral acid, and deionized (DI) water, and then using the washed, chelated polymer as a deionizing resin to remove metal ions from aqueous and non-aqueous systems, such as surfactant solution in water, photoresist compositions, and components of such photoresist compositions.

The CPVP and condensed substituted CSPVP poly vinyl phenol of the present invention must each have at least one active chelating (bonding) site which can form chelates (bonds) with heavy metals such as Fe, Cu, Cr, Ni and other heavy metals, and must also be insoluble in the solvent for the solution being deionized. Therefore, when an aqueous or non-aqueous solution contaminated with ions of heavy metals is passed through this insoluble polymer matrix, chelates can form and metal ions are separated from the solution. The pH for the CPVP or CSPVP deionizing resin is maintained at greater than about 5.0, preferably about 6.0 to 10.0.

The present invention relates to a process for introducing a chelating group into a vinyl phenol polymer, such as polyhydroxystyrene, by reacting the vinyl phenol polymer with a suitable diazonium salt of an aromatic amine or substituted aromatic amine, as shown in FIGS. I and III above (CPVP). Further, the present invention relates to a process for producing a polymer which is insoluble in organic solvent sysytem by condensing the substituted vinyl phenol polymer with formaldehyde to make it solvent rigid, and grounding the polymer to the proper particle size, the condensation reaction is shown in FIGS. II and IV above (CSPVP). In addition, the present invention relates to a process for using such a vinyl phenol polymer, such as polyhydroxystyrene, substituted with at least one chelating group (CPVP), or the formaldehyde condensation product of the substituted vinyl phenol polymer (CSPVP), for removing metal ions from aqueous and non-aqueous systems, such as surfactant solution in water, photoresist compositions and components thereof.

The process for removing metal ions from such a chelated vinyl phenol polymer comprises washing the polymer with water, preferably deionized (DI) water; then with an acid, such as 5–60% mineral acid; and then again washing the polymer with water, preferably DI water, so that the conductivity of the effluent is equivalent to the conductivity of the water, normally about 18 megaohms, and thereby reducing the level of sodium, iron and other heavy metals ions, such as chromium, in the polymer complex to less than 100 ppb each, preferably less than 50 ppb each, and most preferably less than 25 ppb each.

DESCRIPTION OF THE PREFERRED EMBODIMENTS

Most preferably the CPVP or CSPVP is initially rinsed with DI water, followed by washing with a 5–60% mineral acid solution, such as a 10% sulfuric acid solution, rinsed again with DI water, washed again with the mineral acid solution and once again rinsed with DI water so that the conductivity of the effluent is equivalent to the conductivity of the water used to rinse the CPVP or CSPVP. Before purifying any component or admixture in a solvent, it is critical that the CPVP or CSPVP is first rinsed with a solvent which is compatible with the solvent for the composition to be deionized to assure that the CPVP or CSPVP contains no significant amount of an incompatible solvent. Of course, if the material to be deionized is dissolved in water or a water compatible solvent, this step is unnecessary.

The following specific examples will provide detailed illustrations of the methods of producing and utilizing compositions of the present invention. These examples are not intended, however, to limit or restrict the scope of the invention in any way and should not be construed as providing conditions, parameters or values which must be utilized exclusively in order to practice the present invention. Unless otherwise specified all parts and percents are by weight, and all molecular weights (MW) and formula weights (FW) are weight average molecular weights or formula weights, and all parts and percents are by weight.

EXAMPLE 1

2-Aminophenol (48 g, 0.44 mole) was placed in a flask and 450 ml of methanol was added and cooled to 0° C. Sulfuric acid (48 g, 0.484 mole) and sodium nitrite (33.4 g, powdered) were added. An excess of 25 g sodium nitrite and total 58.4 g was added. (400 ml) of water was required for diazotization to be complete. The temperature was held at 0° C. and the solution was filtered through filter paper. A solution of poly p-hydroxystyrene (Weight Average Molecular Weight, 12371, 48.1 g in 1 liter methanol) was added to the above diazo solution. The pH was gradually raised by slowly adding 24 g of 50% caustic (0.3 mole) until the pH reached about 8.0. The solution was stirred overnight. Concentrated hydrochloric acid (108 g, 1.08 mole) was slowly added to achieve complete precipitation of the reaction product. A gummy, decant liquor/gummy polymer was obtained. 2 liters of water and 120 g caustic (50% in water) were slowly added to provide a solution, and the solution was then filtered through filter paper. Concentrated hydrochloric acid (200 g) was slowly added, and a precipitate was formed. The precipitate was filtered through filter paper, washed with cold water and then dried in a vacuum oven to produce a 3-(2-hydroxyphenylazo)-4-hydroxypolystyrene.

EXAMPLE 2

The polymer from example 1 (20 g) was placed in a beaker and DI water was added to make a slurry. The slurry was put into a column having a bed volume of 60 ml., and then washed with 10% hydrochloric acid solution. Enough DI water was passed through the column to substantially remove the hydrochloric acid. When the conductivity of the effluent was found to be 18 mega ohms, the slurry was then passed through the column. The chromium and iron ion level in the polymeric slurry before passing the column was found to be 8100 and 1000 ppb, respectively. The slurry after passing through the column was analyzed for chromium and iron ions and it was found that both chromium and iron ion levels were less than 20 ppb.

EXAMPLE 3

23.48 g of 3-(2-hydroxyphenylazo)-4-hydroxystyrene polymer was placed in a round bottom flask. 100 g of ethyl lactate and 0.24 g of maleic anhydride were added. The reaction mixture was then heated to 95° C., and 16 g of 37% formaldehyde in water was added. A crosslinking reaction occurred at 98° C. DI water was added and the reaction mixture was poured into a beaker, and then filtered through filter paper to yield a solid polymer. The solid polymer was brocken into particles of 300–400 mesh and taken in a beaker, DI water was added and the slury was poured into a column of bed volume 100 ml. The bed was washed with 2 bed volume of DI water, followed by 4 bed volume 10% sulphuric acid solution, followed by 12 bed volume of DI water or until the coductivity of effluent is equal 18 mega ohm. A 37% formaldehyde solution was passed through the column with 10 minutes residence time. Sodium and iron of formaldehyde solution was 100 ppb and 150 ppb respectively before treatment, after treatment both sodium and iron were reduced to less than 20 ppb.

EXAMPLE 4

To a solution of poly p-hydroxystyrene (Molecular Weight 10,000–48.1 g in 1 liter of methanol) in a flask was added 2,1,5-Diazonaphthoquinone-sulphonic acid (122.7 g, 0.44 mole,), with stirring. The pH was adjusted to 12 with a NaOH solution and the water level was balanced. The reaction mixture was stirred for 3 days. The progress of the reaction can be monitored by Infrared Spectroscopy and when the reaction was completed, concentrated hydrochloric acid (108 g, 1.08 mole) was added to get complete precipitation. The precipitate was filtered through filter paper, washed and dried. 43.48 g of 3-(1-hydroxy-5-naphthalenesuphonic acid-2-azo)-4-hydroxypolystyrene was placed in a round bottom flask. 122 g of ethyl lactate and 0.44 g of maleic anhydride were then added. The reaction mixture was heated to 95° C. and 22 g of 37% formaldehyde in water was added. A crosslinking reaction occurred at 98° C., the reaction was allowed to continue at 140° C. for 3 hours and DI water was added. The reaction mixture was poured into a beaker and filtered through filter paper to yield a solid polymer. The solid polymer was brocken into particles of 300–400 mesh and taken in a beaker, DI water was added and the slurry was poured into a column of bed volume 100 ml. The bed was washed with 2 bed volume of DI water, followed by 4 bed volume 10% sulphuric acid solution, followed by 12 bed volume of DI water or untill the coductivity of effluent is equal 18 mega ohm, the column was then washed with 2 bed volume of methanol followed by 4 bed volumes of propylene glycol methyl ether acetate (PGMEA). A 30% solution of novolak resin in PGMEA was passed through the column with 15 minutes residence time, the results of the metal ion analysis both before and after treatment are shown in Table 1 below.

TABLE 1

| Metal Ion | Untreated Sample (ppb) | Treated Sample (ppb) |
|---|---|---|
| Na | 130 | 25 |
| Fe | 103 | 29 |

We claim:

1. A process for producing a chelated vinyl phenol polymer (CPVP) which comprises reacting a vinyl phenol polymer with a diazonium salt of an aromatic amine or substituted aromatic amine, as shown in FIG. I below; washing the CPVP with water; followed by washing with a mineral acid solution; and then again washing with water; thereby reducing the level of sodium, iron and chromium ions in the polymer complex to less than 100 ppb each; and then rinsing the CPVP with a solvent which is compatible with the solvent for the composition to be deionized and thereby providing a CPVP that contains no significant amount of an incompatible solvent; and condensing the CPVP with formaldehyde, as shown in FIG. II below, and thereby producing a condensed substituted polyvinyl phenol:

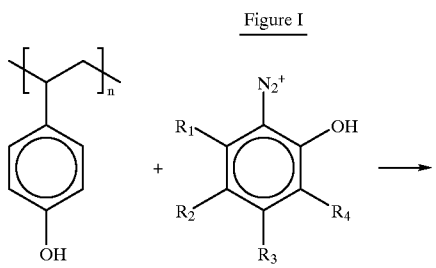

Figure I

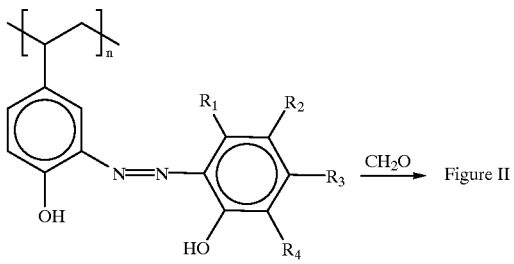

Figure II $R_1 = R_2 = R_3 = R_4 = H$, or
$R_1 = OH, R_2 = R_3 = R_4 = H$, or
$R_1 = R_2 = R_3 = R_4 = OH$, or
$R_1 = R_2 = R_3 = R_4 = C_1-C_3$ alkyl

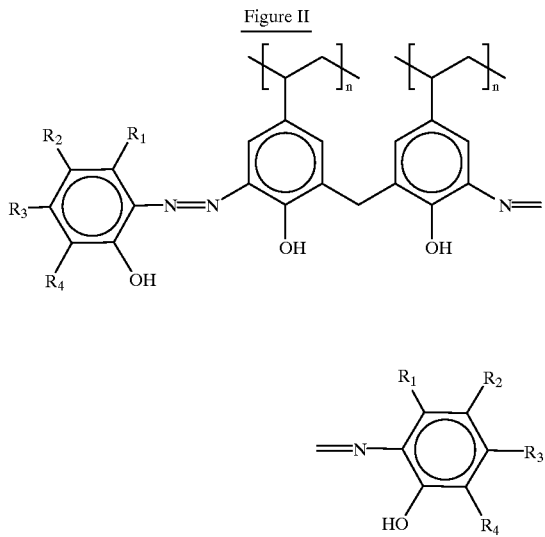

Figure II $R_1 = R_2 = R_3 = R_4 = H$, or
$R_1 = OH, R_2 = R_3 = R_4 = H$, or
$R_1 = R_2 = R_3 = R_4 = OH$, or
$R_1 = R_2 = R_3 = R_4 = C_1-C_3$ alkyl.

2. A process for producing a chelated vinyl phenol polymer (CPVP) which comprises reacting a vinyl phenol polymer with a diazonium salt of an aromatic amine or substituted aromatic amine, as shown in FIG. III below; washing the CPVP with water; followed by washing with a mineral acid solution; and then again washing with water; thereby reducing the level of sodium, iron and chromium ions in the polymer complex to less than 100 ppb each; and then rinsing the CPVP with a solvent which is compatible with the solvent for the composition to be deionized and thereby providing a CPVP that contains no significant amount of an incompatible solvent; and condensing the CPVP with formaldehyde, as shown in FIG. IV below, and thereby producing a condensed substituted polyvinyl phenol:

FIG. III

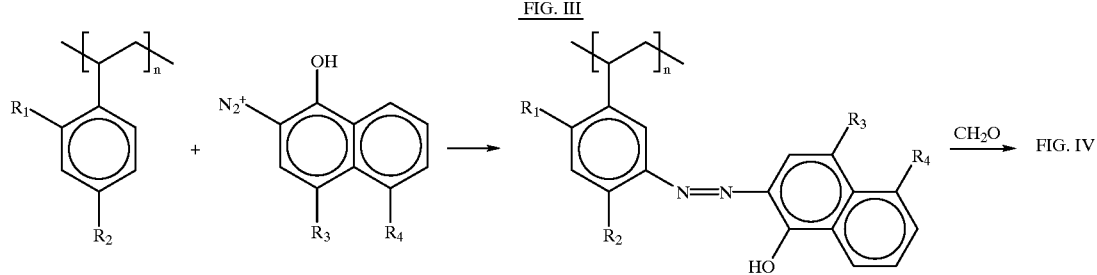

$R_1$ = H, $R_2$ = OH, $R_3$ = H, $R_4$ = $SO_3H$, or
$R_1$ = OH, $R_2$ = H, $R_3$ = $SO_3H$, $R_4$ = H, or
$R_1$ = H, $R_2$ = $NH_2$, $R_3$ = H, $R_4$ = $SO_3H$, or
$R_1$ = $NH_2$, $R_2$ = H, $R_3$ = $SO_3H$, $R_4$ = H.

FIG. IV

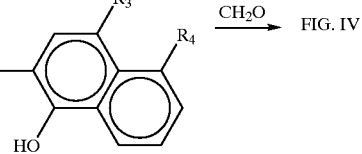

$R_1$ = H, $R_2$ = OH, $R_3$ = H, $R_4$ = $SO_3H$, or
$R_1$ = OH, $R_2$ = H, $R_3$ = $SO_3H$, $R_4$ = H, or
$R_1$ = H, $R_2$ = $NH_2$, $R_3$ = H, $R_4$ = $SO_3H$, or
$R_1$ = $NH_2$, $R_2$ = H, $R_3$ = $SO_3H$, $R_4$ = H.

3. The process of claim 1, wherein the CPVP from either FIGS. I or III of claim 1 is maintained at a pH of from about 6.0 to 10.0.

4. The process of claim 2 wherein the CSPVP from either FIGS. II or IV of claim 2 is maintained at a pH of from about 6.0 to 10.0

5. The process of claim 1, wherein the level of metal ions in the CPVP is reduced to less than 50 ppb each.

6. The process of claim 2, wherein the level of metal ions in the CSPVP is reduced to less than 50 ppb each.

* * * * *